(12) United States Patent
Avery et al.

(10) Patent No.: US 8,758,572 B2
(45) Date of Patent: Jun. 24, 2014

(54) METHOD FOR THE SEPARATION AND CONCENTRATION OF ISOTOPOLOGUES

(75) Inventors: Randall N. Avery, Bogart, GA (US); Charlie Booth, Watkinsville, GA (US); Keith Moser, Libertyville, IL (US)

(73) Assignees: Exelon Generation Company, LLC, Kennett Square, PA (US); Industrial Idea Partners, Athens, GA (US)

( * ) Notice: Subject to any disclaimer, the term of this patent is extended or adjusted under 35 U.S.C. 154(b) by 183 days.

(21) Appl. No.: 13/090,879

(22) Filed: Apr. 20, 2011

(65) Prior Publication Data

US 2012/0266629 A1 Oct. 25, 2012

(51) Int. Cl.
*B01D 3/14* (2006.01)
*F25J 3/00* (2006.01)

(52) U.S. Cl.
USPC ............... 203/5; 203/41; 62/620; 62/626

(58) Field of Classification Search
USPC ............ 203/5, 41; 62/620, 626; 423/249; 376/313; 202/154, 155, 173
See application file for complete search history.

(56) References Cited

U.S. PATENT DOCUMENTS

| | | | |
|---|---|---|---|
| 4,705,635 A | 11/1987 | Knochel et al. | |
| 5,468,462 A * | 11/1995 | Miller et al. | 423/580.2 |
| 5,876,596 A | 3/1999 | Sadkhin | |
| 6,984,327 B1 | 1/2006 | Patterson | |
| 7,297,237 B2 * | 11/2007 | Asano et al. | 203/5 |
| 7,302,812 B2 * | 12/2007 | Okasinski et al. | 62/617 |
| 7,470,350 B2 * | 12/2008 | Bonnett et al. | 203/5 |
| 7,815,890 B2 * | 10/2010 | Busigin | 423/647.7 |
| 7,893,377 B2 * | 2/2011 | Hayashida | 204/157.2 |
| 2005/0279129 A1 | 12/2005 | Muchnik | |

FOREIGN PATENT DOCUMENTS

WO PCT/US2012/20927 1/2012

OTHER PUBLICATIONS

International Search Report and Written Opinion issued on May 8, 2012 for Intl. App. No. PCT/US2012/20927, filed Jan. 11, 2012 (Applicant—Exelon Generation Company, LLC; pp. 1-11).

* cited by examiner

*Primary Examiner* — Nina Bhat
(74) *Attorney, Agent, or Firm* — Ballard Spahr LLP

(57) ABSTRACT

The present invention is a novel method for removing tritium oxide contamination from a solution with water. The method captures the tritium oxide in a much smaller volume suitable for economical disposal. In so doing the original water is decontaminated of the tritium oxide and may be discharged.

17 Claims, 3 Drawing Sheets

METHOD FOR THE SEPARATION AND CONCENTRATION OF ISOTOPOLOGUES

BACKGROUND OF THE INVENTION

Isotopologues are molecules that differ only in their isotopic composition. Hydrogen-related isotopologues of normal or "light" water ($H_2O$) include "semi-heavy water" having a single deuterium isotope (HDO or $^1H^2HO$), "heavy water" with two deuterium isotopes ($D_2O$ or $^2H_2O$), tritiated water having a single tritium isotope (HTO or $^3HOH$) and "super-heavy water" ($T_2O$ or $^3H_2O$). For purposes of this disclosure, the term tritiated water will be used to refer to any water molecule in which one or both hydrogen atoms are replaced with a tritium isotope. Tritiated water is a byproduct of nuclear power generating stations.

Tritium is chemically represented as T or $^3H$ and is a radioactive isotope of hydrogen. Tritium is most often produced in heavy water-moderated nuclear reactors. Relatively little tritiated water is produced. Nevertheless, cleaning tritiated water from the moderator may be desirable after several years of operation of the nuclear station to reduce the risk of tritiated water escaping to the environment. Very few facilities exist that can properly clean or separate tritiated water from a solution or mixture of tritiated water and normal water. The scarcity of facilities makes it necessary to transport relatively large volumes of contaminated water solution containing relatively small volumes of tritiated water across long distances to a location such as Ontario Power Generation's Tritiated Water Removal Facility. Ontario Power's facility can process up to 2.5 thousand tons (2,500 Mg) of contaminated heavy water per year, producing about 2.5 kg of tritiated water.

Tritiated water is produced in pressurized light water reactors as well. The prevalence is directly related to the use of Boron-10 as a chemical reactivity shim. A shim is used to convert high energy neutrons to thermal heat. The production of this isotope follows this reaction:

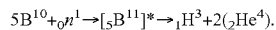
$$5B^{10} + {}_0n^1 \rightarrow [{}_5B^{11}]^* \rightarrow {}_1H^3 + 2({}_2He^4).$$

The half-life of tritiated water is 12.4 years. This is troublesome because it is persistent enough to concentrate in the reactor water. Tritiated water causes no ill reactivity effects within the nuclear reactor, but it does provide a significant risk for contamination from small leaks. Tritium is chemically identical to hydrogen, so it readily bonds with OH as tritiated water (HTO), and can make organic bonds (OBT) easily. The HTO and the OBT are easily ingested by consuming contaminated organic or water-containing foodstuffs. As tritium is not a strong beta emitter, it is not dangerous externally, however, it is a radiation hazard when inhaled, ingested via food or water, or absorbed through the skin. In the form of tritiated water molecules, it can be absorbed through pores in the skin, leading to cell damage and an increased chance of cancer.

HTO has a short biological half life in the human body of 7 to 14 days which both reduces the total effects of single-incident ingestion and precludes long-term bioaccumulation of HTO from the environment. HTO does not accumulate in tissue.

Enrichment of tritiated water by removing the excess water and concentrating the tritiated water can significantly reduce the expense of transporting very low level contaminated materials to a cleaning facility. The available processes are not commercially attractive when starting with low concentrations of tritium as tritiated water because of the transportation costs. No low cost processes have been demonstrated for the concentration of tritiated water due to the fact that it has physical and chemical characteristics that are so similar to water that it precludes normal chemical or thermodynamic measures. These close similarities have previously made it difficult to define processes that will efficiently separate the tritiated water from water. Accordingly, the present disclosure provides improved methods, devices, and systems for separation of isotopologues, including the separation and concentrating of tritiated water, to enable more economical disposal.

SUMMARY OF THE INVENTION

This invention relates generally to methods, devices, and systems for separating or concentrating one or more isotopologues from a mixture of isotopologues. For example, according to some embodiments, the methods, devices and systems can be used to separate and concentrate tritium oxide from a liquid solution of water and tritium oxide, a common byproduct of the nuclear power generation process.

In a first aspect, a method is provided for separating an isotopologue from a fluid mixture of isotopologues. The method comprises first providing a liquid stream comprising a mixture of a first isotopologue having a first freezing temperature and a second isotopologue having a second freezing temperature, wherein the freezing temperature of the first isotopologue is below the freezing temperature of the second isotopologue; and subsequently introducing the liquid stream into a filter capable of selectively capturing the second isotopologue such that at least a portion of the second isotopologue remains in the filter and a liquid filtrate comprising the first isotopologue exits the filter.

In another aspect, a device is provided for separating an isotopologue from a fluid mixture of isotopologues. The device comprises a housing defining an interior chamber having a distal end and a proximal end; filtration media housed within the interior chamber, wherein the filtration media comprises a third isotopologue; an inlet port defined in the proximal end of the housing in communication with the interior chamber and a source of the fluid mixture of isotopologues; and an outlet port defined in the distal end of the housing in communication with the interior chamber and the filtration media. In use, upon entering the interior chamber through the inlet port, at least a portion of the second isotopologue present within the fluid mixture freezes and remains in the filtration media and a liquid filtrate comprising the first isotopologue exits the chamber through the outlet port.

In still a further aspect, a system is provided for continuously separating an isotopologue from a mixture of isotopologues present in a fluid mixture. The system comprises a housing defining an interior chamber having a distal end and a proximal end; a grinder positioned in communication with the distal end of the interior chamber; a source of filter media; and a means for exerting pressure onto the filter media, wherein the filter media is positioned in the interior chamber between the grinder and the means for exerting pressure; a first inlet port defined in the housing in communication with the interior chamber and the solution; a second inlet port defined in the housing in communication with the interior chamber and the source of filter media; and a first outlet port defined in the housing in communication with the interior chamber. In use, upon entering the interior chamber through the first inlet port, at least a portion of the undesired material present in a solution freezes and remains in the filter media and a liquid filtrate comprising the filtered solution exits the chamber through the outlet port.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Figure 1:
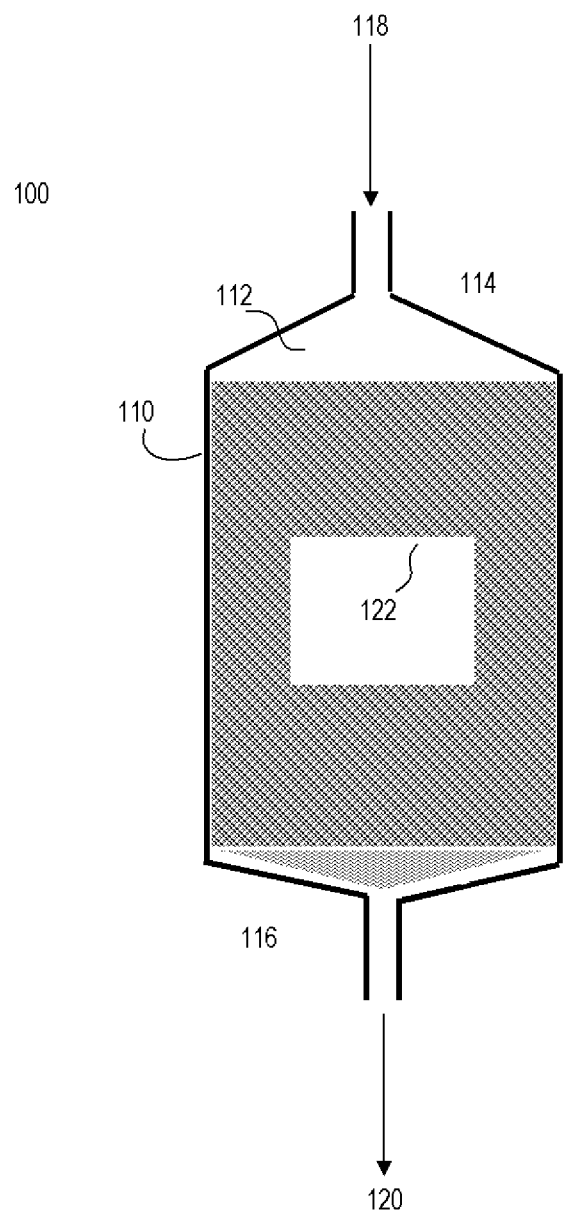
FIG. 1 is a schematic illustration of an exemplary filtration device according to an aspect of the present invention.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those of ordinary skill in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to an "isotopologue" can include two or more such isotopologues unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the term "water" refers to normal or light water having the chemical formula $H_2O$.

As used herein, the term "deuterium oxide" will refer to any of the hydrogen-related isotopologues of water having the chemical formula $D_2O$ or HDO.

As used herein, the term "tritium oxide" will refer to any form of the hydrogen-related radioactive isotopologues of water having the chemical formula $T_2O$ or HTO.

As used herein, the term "contaminant" refers to any quantity of tritium oxide.

As used herein, the term "contaminated solution" will include a solution or liquid stream of water that contains any quantity of tritium oxide.

As used herein, the term "cooled" or "cooling" includes the removal of sensible heat from a liquid stream, including for example a contaminated solution, resulting in a temperature greater than 0° C. and less than or equal to 3.82° C.

As used herein, the term "feed" refers to the cooled contaminated solution as it enters a filter.

As used herein, the term "filter media" refers to either finely divided deuterium oxide ice or finely divided contaminated ice, or a combination of both.

As used herein, the term "filtrate" refers to the portion of the contaminated solution that is not captured in the filter media as it passes through the filter.

As used herein, the term "capture" refers to the chemical, physical or mechanical process of removing the contaminant from a contaminated solution using, either in part or in whole, freezing, adsorption, nucleation, or inclusion into the crystal lattice of the filter media.

As used herein, the term "filter" refers to a unit of operation so designed to capture contaminants that has the function of receiving the feed, containing the filter media, and producing the filtrate.

As used herein, the term "ice" refers to the solid phase state of matter of water and any of the isotopologues of water, including deuterium oxide and tritium oxide.

As used herein, the term "contaminated ice" refers to the solid phase in the state of matter of a solution of deuterium oxide and tritium oxide.

As used herein, the term "isotopologue" refers to molecules that differ only in their isotopic composition. The isotopologue of a chemical species has at least one atom with a different number of neutrons than the parent atom. An example is water, where some of its hydrogen-related isotopologues are: "light water" (HON or $H_2O$), "semi-heavy water" with the deuterium isotope in equal proportion to protium (HDO or $1H^2HO$), "heavy water" with two deuterium isotopes of hydrogen per molecule ($D_2O$ or $^2H_2O$), and "super-heavy water" or tritiated water ($T_2O$ or $^3H_2O$), where the hydrogen atoms are replaced with tritium isotopes.

As summarized above, in one aspect the present invention generally provides a method for separating a mixture of isotopologues. Isotopologues are molecules that differ only in their isotopic composition. Thus, the isotopologue of a chemical species has at least one atom with a different number of neutrons than the parent. As is often the case, isotopologues exhibit different physical and or chemical properties, such as for example, different melting points, freezing points, or crystallization points. The method of the present invention utilizes differences in the physical or chemical properties among various isotopologues as a means for facilitating their separation.

In one embodiment, the method of the present invention utilizes the differences in freezing or crystallization points among various isotopologues as a means for separating a mixture of those various isotopologues. According to this embodiment, the method comprises first providing a liquid stream comprising a mixture of a first isotopologue having a first freezing temperature and a second isotopologue having a second freezing temperature, wherein the freezing temperature of the first isotopologue is below the freezing temperature of the second isotopologue. The liquid stream is then introduced into a filtration device capable of selectively freezing or crystallizing the second isotopologue such that at least a portion of the second isotopologue freezes or crystallizes and remains in the filter and a liquid filtrate comprising the first isotopologue exits the filter.

The filtration device capable of selectively freezing or crystallizing the second isotopologue can, for example, be any flow through filtration media maintained at a temperature between the freezing temperature of the first isotopologue and the freezing temperature of the second isotopologue. As the liquid stream passes through the temperature controlled filter, the filtration media serves as a nucleation site for freezing and crystallization of the second isotopologue because the freezing temperature of the second isotopologue in the liquid stream is greater than the temperature at which the filtration media is being maintained. Additionally, since the filtration media is maintained at a temperature higher than the freezing or crystallization point of the first isotopologue, a liquid filtrate comprising the first isotopologue does not freeze and passes on through the filtration media.

The method of the invention is particularly well suited for the separation of tritium oxide from a liquid stream comprising water and tritium oxide. As one of ordinary skill in the art will appreciate, under standard atmospheric pressure conditions the freezing point of water is approximately 0.0° C. and the freezing point of tritium oxide is approximately 4.49° C. Thus, by passing a liquid stream comprising a mixture of water as a first isotopologue and tritium oxide as a second isotopologue through a filtration device comprising filtration media maintained at a temperature in the range of from greater than 0° C. to less than 4.49° C., at least a portion of the tritium oxide will nucleate, freeze and crystallize out of the liquid stream to remain in the filter while liquid filtrate comprising water will continue to pass through the filter.

In the following discussions of specific embodiments of the invention, normal or light water will be referenced as a first exemplary isotopologue and tritiated water will be referenced as a second exemplary isotopologue. Still further, in other exemplary embodiments deuterium oxide will be referenced as yet a third isotopologue suitable for use as a filtration media. However, this usage is for convenience only and reflects the fact that the methods of the invention described herein are particularly well suited for the separation of tritium oxide from a liquid stream comprising water and tritium oxide. Thus, these exemplary discussions are not intended to limit the invention only to the use of these isotopologues or to methods for separating and or concentrating these isotopologues.

In still a further embodiment of the disclosed method, it can be particularly advantageous for the filtration media to be comprised of a third isotopologue of the first and second isotopologues present in the liquid stream. For example, with reference again to the exemplary liquid stream comprising water as a first isotopologue and tritium oxide as a second isotopologue, frozen deuterium oxide or deuterium oxide ice can be used as an exemplary filtration media. As one of ordinary skill in the art will appreciate, under standard atmospheric pressure conditions the freezing point of deuterium oxide is approximately 3.82° C. Thus, by passing a liquid stream comprising a mixture of water as a first isotopologue and tritium oxide as a second isotopologue through a filtration device comprising deuterium oxide ice as the filtration media maintained at a temperature in the range of from greater than 0° C. to less than 3.82° C., at least a portion of the tritium oxide within the liquid stream will nucleate and freeze upon contact with the deuterium ice while liquid filtrate comprising water will continue to pass through the filter.

In still a further embodiment of the disclosed method, the filtration media to remove tritium oxide from the exemplary liquid could be material other than an isotopologue of water providing the filtration media is maintained at a temperature between approximately 4.49° C. and 0° C., provides a nucleation site for the freezing of the tritium oxide and provides a crystalline structure that can easily accept the tritium oxide ice structure. To that end, experimental results indicate that a material such as stainless steel wool does not perform as well as a filtration media because it does not exhibit a crystalline structure suitable for capturing the tritium oxide ice. Normal (light) water ice has also been tried experimentally and does not perform as well as a filtration media because it will melt when held at a temperature between 4.49° C. and 0° C.

Maintaining the filtration media at a desired temperature as described herein can be accomplished using any conventionally known means for adjusting temperature, including for example conventional refrigeration techniques. In an exemplary embodiment, the filtration device can be submerged in an ice bath that is itself maintained at a desired temperature.

Optionally, prior to introducing the liquid stream into the filtration device, the method can further comprise adjusting the temperature of the liquid stream to a temperature less than the temperature at which the filtration media is maintained. For example, with reference again to the embodiment where the liquid stream comprises a mixture of water and tritium oxide and the filtration media comprises deuterium ice maintained at a temperature in the range of from greater than 0° C. to less than 3.82° C., it can be advantageous to optionally ensure the temperature of the liquid stream is similarly in the range of from greater than 0° C. to less than 3.82° C. prior to introducing the liquid stream into the filter. As will be appreciated, a liquid stream at a temperature greater than the melting point of the deuterium ice filtration media can lead to subsequent melting of the filtration media as well as any tritium oxide that has crystallized and collected in the filtration media. However, by adjusting the liquid stream to a temperature that is colder than the freezing points of the either deuterium oxide ice or the tritium oxide ice that has nucleated and crystallized in the filtration media, the liquid solution passing through the filter will not melt either the deuterium oxide ice or the captured tritium oxide that remains in the filter. In addition since the liquid stream is still maintained at a temperature that is warmer than the freezing point of water in the liquid stream, the water itself does not freeze as it passes through the filter media as filtrate.

In similar fashion to the filtration media, adjusting the temperature of the liquid stream to a desired temperature as described herein can be accomplished using any conventionally known means for adjusting temperature, including for example conventional refrigeration techniques. In an exemplary embodiment, the liquid stream can travel from a source point to the filter through a feed line that is itself cooled such that the residence time of the liquid stream in the feed line results in the desired cooling of the liquid stream. In a further exemplary aspect, the feed line can also be submerged in an ice bath that is itself maintained at a desired temperature.

The filtration device can be any filter capable of selectively freezing or crystallizing a desired isotopologue present in liquid mixture of isotopologues while allowing a liquid filtrate to pass through. For example, as noted above in connection with a liquid stream comprising a mixture of a water and tritium oxide, the filtration device can comprise frozen deuterium oxide as a suitable filtration media. The deuterium oxide ice can be milled using convention milling devices to provide finely divided deuterium oxide ice particles. For example, milling can be performed by commercially available mechanical methods or techniques for producing finely divided ice or contaminated ice crystals, including but not limited to crushing, grinding, shaving, spray-freezing, cryogenic flash freezing, adiabatic snow machine, and scrapped wall crystallizers. By finely dividing the surface of the frozen deuterium oxide, the surface area available to be contacted by the liquid stream passing through the filter media can be greatly increased and thus reaction kinetics are greatly increased. The filtration media, such as for example the deuterium oxide ice, can be milled to provide any desired particle size distribution. As one of ordinary skill in the art will appreciate in view of this disclosure, the particle size characteristics of the filtration media can be readily customized as desired depending on various factors, including for example a desired surface area of the filtration media, a desired pore volume or open space volume within the bed of filtration media that is able to accept an incoming feed, or desired flow rates through the filter. In various preferred embodiments, the deuterium oxide ice used as filtration media can be milled to provide a plurality of finely divided ice particles having a particle size less than 425 μm.

With reference to FIG. 1, an exemplary filtration device 100 is shown. As depicted, the filtration device can comprise a vessel or housing 110, such as for example a cylindrical filter tube, defining an interior chamber 112 and having a proximal end 114 and a distal end 116. A first inlet port 118 can be defined in the proximal end of the cylinder providing fluid communication for a liquid mixture of isotopologues 118 to the interior chamber. An outlet port 120 can be defined in the distal end of the cylinder similarly providing fluid communication for a filtrate stream exiting the interior chamber of the cylinder. Suitable filtration media, such as a packed bed of frozen deuterium oxide ice particles 122, are housed within the interior chamber such that a liquid stream entering the chamber via the inlet port 118 contacts the filtration media within the cylinder. Upon contact with the filtration media, a second isotopologue present within the liquid stream, such as for example tritium oxide, will nucleate and crystallize such that it remains captured by the filtration media while a liquid filtrate comprising a first isotopologue, such as for example water, passes through the filtration media and subsequently exits the outlet port 120.

The filtrate exiting the filtration device can be collected and analyzed to, for example, determine what, if any, amount of second isotopologue remains in the filtrate. Such analysis can be performed manually or can be automated laboratory or analytical testing of filtrate using such methods as, for example, liquid scintillation counting. For example, with reference again to the above described embodiment where the liquid stream comprises a mixture of water and tritium oxide, the filtrate can be analyzed using liquid scintillation counting to determine what, if any, amount of tritium oxide remains in the liquid filtrate that has passed through the filter. If, it is determined that an amount of second isotopologue remains in the filtrate and if the amount of second isotopologue remaining in the filtrate exceeds a predetermined threshold amount, the filtrate can be reprocessed by reintroducing the filtrate back into the filter. This step of reprocessing filtrate can, optionally comprise homogenizing the analyzed filtrate with additional liquid stream that has yet to enter the filtration device.

In an alternative embodiment, if following an analysis of the filtrate it is determined that an amount of the second isotopologue remaining in the filtrate is less than a predetermined threshold amount the filtrate can be directly disposed of. With reference to the exemplified embodiment of tritium oxide removal from a liquid stream of water, the "disposal" of filtrate can include conventional disposal into the waterways once the concentration of tritium oxide within the filtrate is within legally permissible values for the relevant jurisdiction. For example, in the United States it is legally permissible to dispose a water stream into the waterways if the specific activity from tritium is less than 20,000 pCi/liter. Accordingly, in some embodiments the disclosed method is capable of capturing and separating an isotopologue from a mixture of isotopologues in a manner that enables disposal of the filtrate. For example, the method can reduce the concentration of tritium oxide present in a liquid stream of water from a threshold value of greater than 20,000 pCi down to a concentration that is below the threshold value 20,000 pCi such the filtrate can be permissibly disposed into United States waterways.

The filtration media can also be subjected to optional processing steps if desired. For example, over time it may be advantageous to remove the filtration media for subsequent disposal of the filtration media, disposal of the isotopologue captured by the filtration media, or to recycle the filtration media. With reference again to the exemplified filtration media comprising particulate deuterium oxide ice, the filtration media can be recycled. This recycling process can comprise removing the deuterium oxide ice along with any tritium oxide capture by the filtration media, melting the frozen deuterium oxide filter media and frozen tritium oxide together to provide a combined melt stream, homogenizing the melt stream, and subsequently refreezing the homogenized melt stream to provide a second generation or recycled filtration media. Once refrozen, the combined deuterium oxide and tritium oxide can again be milled to any desired particle size distribution as described herein before being recharged as filtration media into a filtration device. This optional recycling step allows for a separated isotopologue, such as tritium oxide captured on the surface of the finely divided deuterium oxide ice, to be securely incorporated by homogenization and re-freezing into a crystalline lattice. This prevents the reintroduction of the separated isotopologue into the liquid stream as it passes through the filter media in the filter. This also allows the filter media to continue to effectively capture and separate isotopologue contaminants even when the level of contaminant in the contaminated ice is greater than the level of contaminants in the contaminated solution. However, it should be understood that in the exemplified embodiment of tritium oxide removal from water, subsequent disposal of filtration media containing highly concentrated levels of tritium oxide will require special processing by a licensed disposal facility.

As one of ordinary skill in the art will appreciate, when attempting to concentrate or separate tritium oxide from a liquid stream of water, special consideration can also be given to ensure accidental release or leakage of contained tritium does not occur. In connection with the disclosed method where separation of tritium can be accomplished by freezing or crystallization of tritium oxide, optional steps can also be taken to prevent or minimize the risk that frozen tritium oxide will sublime and escape into the surrounding environment. To that end, in still further embodiments of the disclosed method, environmental conditions surrounding the filtration device can be modified from ambient or atmospheric conditions in order to prevent such sublimation of the tritium oxide. For example, the filtration device can be submerged in an aqueous bath. If desired, the aqueous bath can, as described above, be maintained at a temperature cold enough to prevent the deuterium oxide filtration media and tritium oxide collected therein from melting. Additionally, the aqueous bath minimizes the likelihood that tritium oxide ice will sublime. According to certain embodiments, it has been found that maintaining the filtration device in the bath at depths of at least 2.5 inches of water can be preferred. In still further attempts to prevent sublimation of tritium oxide, the filtration device can be maintained at pressures significantly lower than atmospheric conditions. For example, it has been found that maintaining the filtration device in an environment where the pressure is at or below 6 mm of Mercury can similarly be effective in minimizing the risk that frozen tritium oxide may sublime. In still further embodiments, the method can comprise maintaining the filtration device in both an aqueous bath and under reduced pressure conditions as described above.

Figure 2:
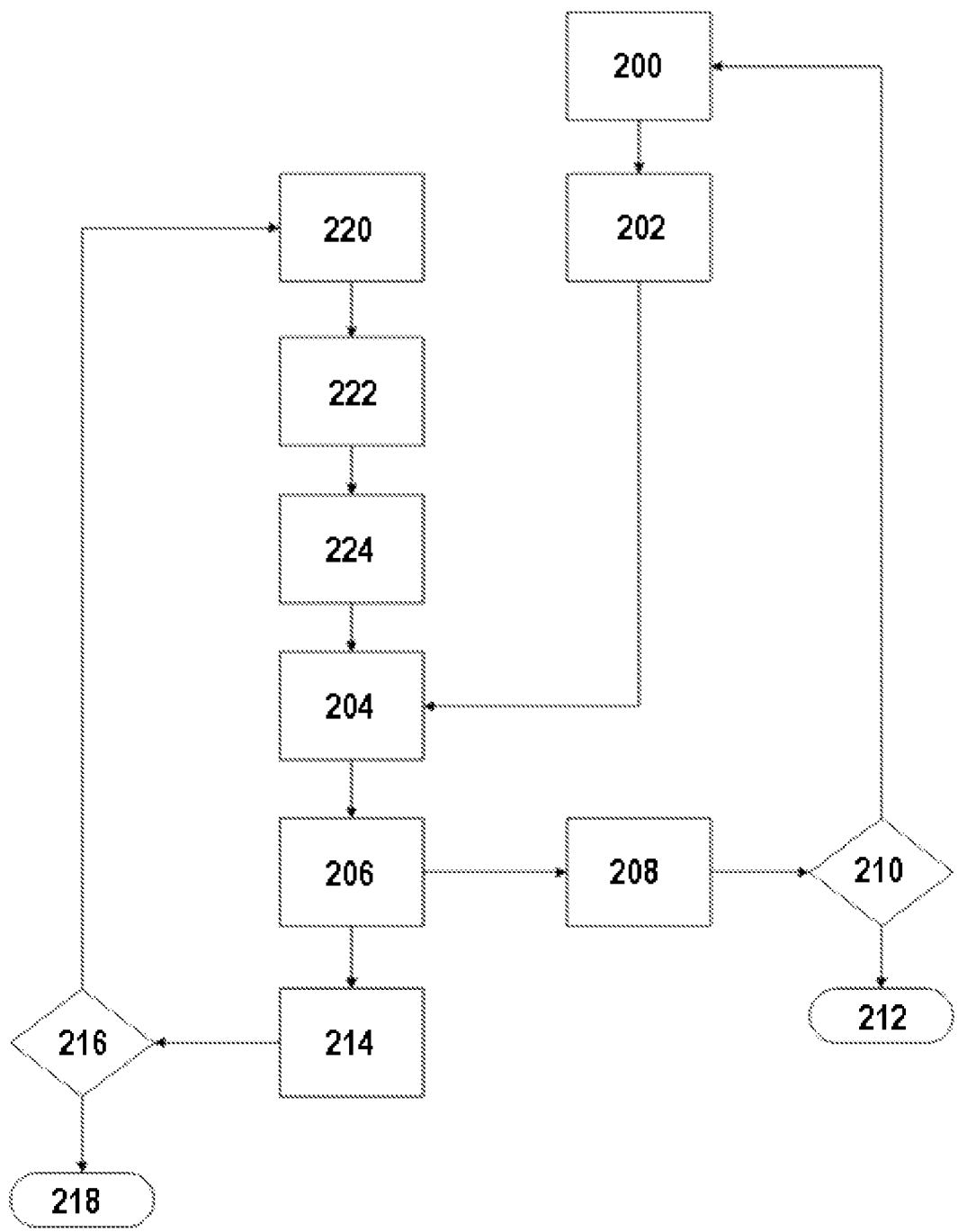
FIG. 2 is a flow chart illustrating an exemplary separation process for removal of tritium oxide from a mixture water and tritium oxide. Additionally, FIG. 2 also provides a flow chart illustration of an exemplary recycling process for subsequent processing of deuterium oxide filtration media utilized during the exemplary separation process.

The methods disclosed herein enable a continuous separation of isotopologues, such as the separation of tritium oxide from a liquid water stream. With reference to FIG. 2, a flow chart is provided to illustrate an exemplary sequence of the disclosed methods. As shown a contaminated solution or liquid stream 200 comprising a mixture of water and tritium oxide is cooled to a predetermined temperature, such as for example approximately 1.0° C., at step 202. Following the cooling step, the liquid stream is then introduced into a filter 204, comprising filtration media such as finely divided deuterium oxide ice particles. Filtrate 206 is then recovered and analyzed at step 208. Following the analysis and determination of the levels of tritium oxide still present, at step 210 the filtrate can either be directed back into the filtration process as feed stream or can be directed to subsequent disposal process 212.

With further reference to FIG. 2 and in combination with the filtration loop process described in steps 200 to 212 above, the deuterium oxide filtration media can also be subjected to a continuous recycle or disposal loop. As illustrated, following recovery of the filtrate 206, the deuterium oxide filtration media containing captured tritium oxide can be removed from the filter, melted, and homogenized in step 214. Following homogenization, a determination 216 can be made as to whether to send the melted homogenized material to the recycle loop or to dispose of the material via step 218. If the homogenized melt stream is to be recycled, the combined liquid deuterium oxide and tritium oxide is refrozen in step 220. The refrozen material is then milled during step 222 and recharged into the filtration device at step 224 where it is then ready to again receive a liquid feed stream from the filtration loop.

Figure 3:
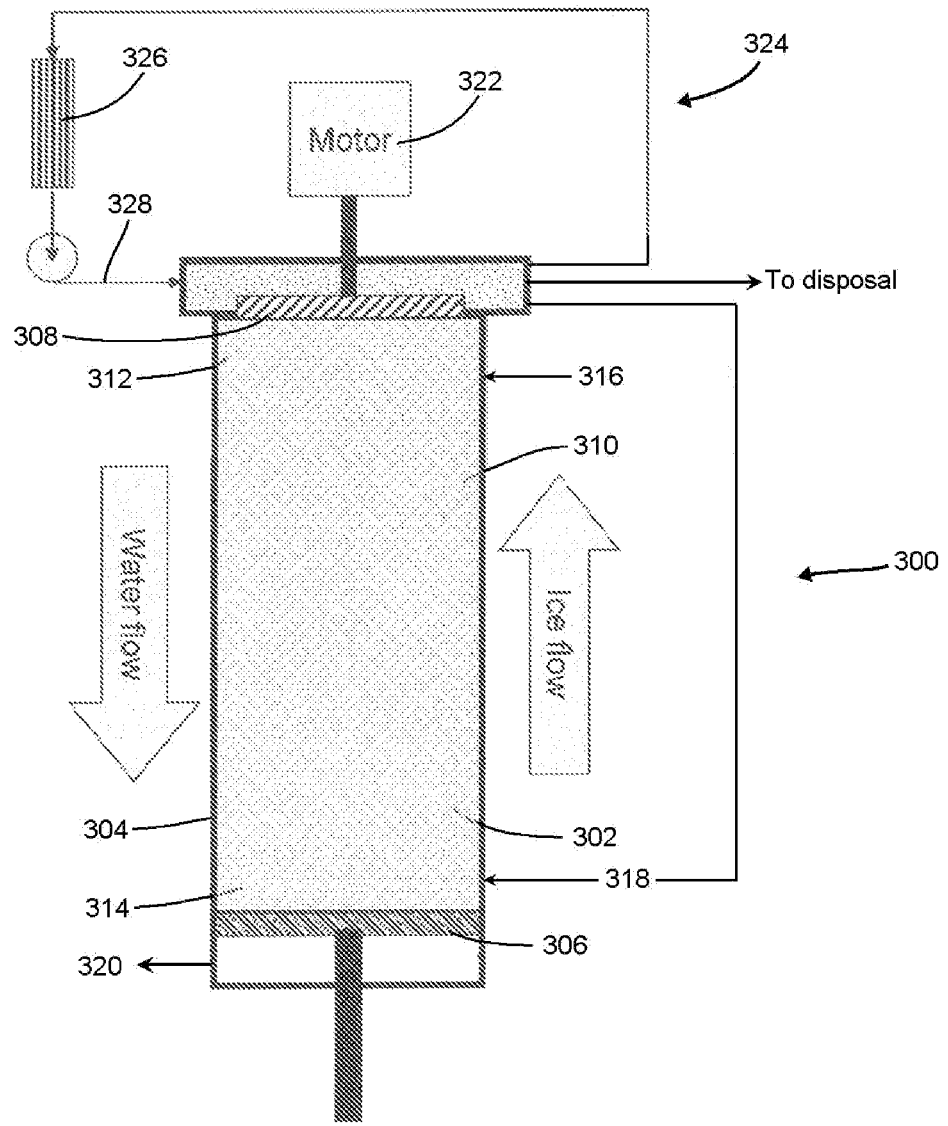
FIG. 3 is a schematic illustration of an exemplary system for continuous separation of an isotopologue present in a liquid mixture of isotopologues.

As illustrated in FIG. 3, a system 300 for continuously separating an isotopologue from a mixture of isotopologues present in a solution is provided. In one aspect, the isotopologue to be separated is tritium oxide present in a solution of water. As can be appreciated by one skilled in the art, however, the system can be modified to separate any isotopologue from a mixture of isotopologues. In one aspect, the system 300 comprises at least one of: a source of filter media 302, a housing 304, a means for exerting pressure 306 onto the filter media, and a grinder 308. In another aspect, the housing defines an interior chamber 310 having a distal end 312 and a proximal end 314. In one aspect, the housing can be cylindrical in shape having a substantially circular cross-sectional area; other cross-sectional areas such as substantially square and substantially rectangular are also contemplated. In another aspect, the distal and proximal ends of the housing 304 can be open so that the distal and proximal ends 312, 314 of the housing are in communication with the surrounding environment.

A plurality of inlet and/or outlet ports can be defined in the housing 304 for communication with the interior chamber 310 of the housing. In one aspect, a first inlet port 316 can be defined in the housing 304. In this aspect, the first inlet port can be in communication with the interior chamber and the solution. In another aspect, a second inlet port 318 can be defined in the housing in communication with the interior chamber 310 and the source of filter media 302. In still another aspect, the first inlet port 316 can be spaced from the distal end 312 of the interior chamber 310 a first distance, and the second inlet port can be spaced from the distal end 312 of the interior chamber a second distance, wherein the second distance can be greater than the first distance. Alternatively, the second distance can be less than or equal to the first distance. In another aspect, the first and second inlet ports 316, 318 can be defined in the housing 304 such that the first and second inlet ports are defined in positions between the means for exerting pressure 306 and the grinder 308. In another aspect, a first outlet 320 can be defined in the housing 304 in communication with the interior chamber. In a further aspect, the first outlet 320 can be defined in the housing such that the means for exerting pressure 306 is positioned between the grinder 308 and the first outlet 320.

The grinder 308 can be positioned in communication with the distal end 312 of the interior chamber 310. In one aspect, the grinder can seal the distal end of the interior chamber so that any material entering and/or exiting the distal end 312 of the interior chamber 310 must pass through the grinder 308. In another aspect, the grinder can be configured for grinding ice. In still another aspect, the grinder 308 can be coupled to a motor 322 configured to operate the grinder at a desired speed.

According to one aspect, the means for exerting pressure 306 can comprise, for example and without limitation, a piston. In another aspect, the means for exerting pressure can be configured for biaxial movement from the proximal end 314 of the interior chamber 310 a predetermined distance. For example, if the means for exerting pressure comprises a piston, the piston can move axially in a direction from the proximal end of the interior chamber toward the distal end 312 a predetermined distance. Upon reaching the predetermined distance or at any position between the predetermined distance and the proximal end 314 of the interior chamber 310, the piston can move axially towards the proximal end of the interior chamber. In an alternative aspect, the means for exerting pressure can comprise a separate feed mechanism such as a screw drive. The screw drive can be configured to inject additional filter media into the chamber and thereby pressurize the chamber.

In another aspect, the means for exerting pressure 306 can be fluid transmissible. For example, a liquid such as water and/or a gas such as steam can pass through the means for exerting pressure, but a solid such as ice can be prevented from passing through the means for exerting pressure 306. In a further aspect, the means for exerting pressure can seal the proximal end 314 of the interior chamber 310 so that any material entering and/or exiting the proximal end of the interior chamber must pass through the means for exerting pressure. Thus, in another example, water could exit the proximal end 312 of the interior chamber through the means for exerting pressure 306, whereas ice could be prevented from exiting the proximal end of the interior chamber.

In one aspect, the filter media can be positioned in the interior chamber 310 of the housing 304 between the grinder 308 and the means for exerting pressure 306. In another aspect, the filter media can be a solid material. In still another aspect, the filter media 302 can be ice, such as for example and without limitation, deuterium oxide ice.

The system 300 can further comprise a melt loop 324 comprising at least one heating means and a means for transferring heat from the heating means to a desired material. In one aspect, the melt loop 324 can comprise a conventional melt heater 326 and a heat transfer line 328. The melt loop can be configured for raising the temperature of a material a predetermined amount. For example, the melt loop can be configured to melt the filter media along with any tritiated ice captured by the filter media together for analysis, further processing, and/or disposal. In another example, the melt loop 324 can be configured for raising the temperature of an ice mixture a predetermined amount such that some materials in the mixture melt, while other materials in the mixture remain frozen. In one aspect, the melt loop can be configured to separate the portion of the filter media 302 ground by the grinder 308 from tritiated ice ground by the grinder In one aspect, the system 300 can further comprises a means for chilling the housing 304. As can be appreciated, the means for chilling the housing can comprise an electric refrigeration system, cryogenic fluids, an aqueous bath and the like. In another aspect, the means for chilling the housing can further comprise at least one insulating layer surrounding at least a portion of the housing 304. In one aspect, the housing 304 can be maintained at a temperature of between about 0.1° C. and 3.7° C. In another aspect, the housing 304 can be maintained at a temperature of between about 0.1° C. and 0.5° C.

In use, filter media can be input into the interior chamber 310 of the housing 304 from the source of filter media through the second inlet port 318. In one aspect, the filter media can be deuterium oxide ice. As described above, the filter media can be forcibly injected into the interior chamber 310 by a means for exerting pressure 306, such as a screw feed mechanism. The solution containing the isotopologue to be separated can be input into the chamber 310 through the first inlet port 316. In another aspect, the isotopologue to be separated can be tritium oxide, and at least a portion of the tritium oxide present in the solution can freeze becoming tritiated ice. In another aspect, the solution can have a temperature such that the tritium oxide is frozen becoming tritiated ice in the solution before entering the interior chamber. Upon entering the interior chamber 310, any water present in the solution can remain unfrozen and pass through the means for exerting pressure 306 and out the outlet port 320 of the housing. At least a portion of the tritiated ice can become contained in the filter media.

The means for exerting pressure 306 can move toward the distal end 312 of the interior chamber 310 a predetermined distance, thereby urging the filter media 302 and any filtrate (for example, tritiated ice) contained in the filter media towards the grinder 308. Upon contacting the grinder, at least a portion of the filter media and the tritiated ice can be ground by the grinder into smaller ice particles. In one aspect, heat can be transferred from the melt loop 324 to the particles created by the grinder and this heat can be sufficient to raise the temperature of the particles above the melting point of the particles. After melting, the particles can be homogenized and analyzed to determine the concentration and/or amount of tritium oxide present. Based at least in part on this analysis, a decision can be made as to whether to re-freeze the melted homogenized particles and send the refrozen homogenized particles material to the interior chamber 310 through the second inlet port 318 for further processing; or dispose of the melted homogenized particles. Alternatively, in another aspect, heat can be transferred from the melt loop 324 to the particles created by the grinder and this heat can be sufficient to raise the temperature of the particles such that the filter media can melt to a liquid while the tritium oxide can remain a solid. The filter media can be separated, refrozen into ice and returned the interior chamber 304 for reuse. The undesired material can be analyzed and returned to the interior chamber for re-processing or disposed of.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric.

Several experiments were conducted using finely divided deuterium ice as a filtration media for the separation or concentration of tritium water from a liquid mixture. According to these experiments, a single 60 ml plastic medical syringe was used as the filter cartridge. A stuffing material comprised of conventional filter paper was packed into the bottom to prevent the filter media from exiting the syringe. Finely divided deuterium ice was then packed into the syringe. The syringes were then stored in water/water ice slurry to prevent any premature melting of the filtration media. A liquid feed comprising tritium water and normal water was pre-cooled to about 0.5° C. before being introduced into the top of the syringe. Once cooled, the feed was then introduced into the syringe. The liquid feed was then allowed to flow through the syringe under the force of gravity and the resulting filtrate was collected. In a first subset of these experiments (experiments 1-5), the filtrate was allowed to exit the syringe as a matter of course without being retained. Pursuant to experiments 6-9, the liquid feed was retained within the syringe for a period of 30 or 60 seconds after which the filtrate was then allowed to exit the syringe.

The results of these experiments are set forth in data Tables 1 and 2 below where various parameters were measured. In particular, Table 1 reports the mass and tritium activity for both the initial feed and the resulting filtrate.

TABLE 1

| Exp. | Description | Feed in (gm) | Feed in (pCi) | Filtrate out (gm) | Filtrate out (pCi) | Feed in (pCi/gm) | Filtrate out (pCi/gm) |
|---|---|---|---|---|---|---|---|
| 1 | single filter - no retention | 50.38 | 228,725 | 48.65 | 176,600 | 4,540 | 3,630 |
| 2 | single filter - no retention | 48.61 | 220,689 | 46.3 | 181,033 | 4,540 | 3,910 |
| 3 | single filter - no retention | 57.37 | 238,659 | 56.13 | 212,171 | 4,160 | 3,780 |
| 4 | single filter - no retention | 58.68 | 241,175 | 57.8 | 225,420 | 4,110 | 3,900 |
| 5 | single filter - no retention | 56.77 | 234,460 | 56.59 | 216,740 | 4,130 | 3,830 |
| 6 | single filter - with retention for 30 seconds | 6.11 | 25,295 | 2.87 | 9,500 | 4,140 | 3,310 |
| 7 | single filter - with retention for 30 seconds | 12.13 | 50,218 | 8.67 | 29,738 | 4,140 | 3,430 |
| 8 | single filter - with retention for 60 seconds | 8.73 | 36,142 | 4.78 | 15,344 | 4,140 | 3,210 |
| 9 | single filter - with retention for 60 seconds | 8.13 | 33,658 | 4.26 | 12,865 | 4,140 | 3,020 |

Similarly, Table 2 reports the mass of the filtration media before (pre) and after (post) separation. Table 2 also reports the tritium activity of the filtration media following a separation as well as the increase is mass. It is to be noted that when using non contaminated deuterium oxide ice as the filtration media, the pre measurements reflect no activity.

TABLE 2

| Exp. | Description | Filter Media pre (gm) | Filter Media post (gm) | Filter Media post (pCi) | Filter Media gain (gm) | Filter Media post (pCi/gm) | Conc. ratio | Activity red. ratio |
|---|---|---|---|---|---|---|---|---|
| 1 | single filter - no retention | 18.4 | 20.13 | 39,052 | 1.73 | 22,574 | 6.22 | 20% |
| 2 | single filter - no retention | 19.11 | 21.69 | 37,524 | 2.58 | 14,544 | 3.72 | 14% |
| 3 | single filter - no retention | 18.98 | 20.09 | 25,813 | 1.11 | 23,255 | 6.15 | 9% |
| 4 | single filter - no retention | 15.65 | 16.5 | 19,093 | 0.85 | 22,462 | 5.76 | 5% |
| 5 | single filter - no retention | 16.3 | 16.45 | 19,234 | 0.15 | 128,227 | 33.48 | 7% |
| 6 | single filter - with retention for 30 seconds | 19.46 | 22.7 | 16,230 | 3.24 | 5,009 | 1.51 | 20% |
| 7 | single filter - with retention for 30 seconds | 19.98 | 23.55 | 19,980 | 3.57 | 5,597 | 1.63 | 17% |
| 8 | single filter - with retention for 60 seconds | 24.43 | 28.45 | 19,862 | 4.02 | 4,941 | 1.54 | 22% |
| 9 | single filter - with retention for 60 seconds | 26.57 | 30.46 | 21,655 | 3.89 | 5,567 | 1.84 | 27% |

Utilizing the date from Tables 1 and 2 above, the effectiveness of the filtration media was then evaluated. Tritium Activity remaining in the filter media after a filtration cycle was concentrated an average of 6.8 times relative to the activity measured in the initial feed stream. Similarly, the resulting filtrate analysis indicated that the tritium activity in the filtrate was reduced an average of 16% relative to the activity in the initial feed stream.

Table 3 similarly shows that the mass balance and tritium activity balance for the experiments reflected in Table 1 were within a range of plus or minus (+/−) 6%. Thus, these experiments show that methods and systems according to the above described embodiments wherein deuterium ice is used as a filtration media are effective in separating and concentration tritium water from a feed of contaminated normal water.

TABLE 3

| | Mass Balance | | | | Activity Balance | | | |
|---|---|---|---|---|---|---|---|---|
| Exp. | Total mass in (gm) Feed in plus Filter Media pre | Total mass out (gm) Filtrate out plus Filter Media post | Mass "gained" (gm) Total mass in minus Total mass out | % mass balance | Total activity in (pCi) Feed in | Total activity out (pCi) Filtrate out plus Filter Media post | Activity "gained" (pCi) Total activity in minus Total activity out | % activity balance |
| 1 | 68.78 | 68.78 | 0 | 100.0% | 228725 | 215652 | −13074 | 105.7% |
| 2 | 67.72 | 67.99 | 0.27 | 99.6% | 220689 | 218557 | −2133 | 101.0% |
| 3 | 76.35 | 76.22 | −0.13 | 100.2% | 238659 | 237984 | −675 | 100.3% |
| 4 | 74.33 | 74.3 | −0.03 | 100.0% | 241175 | 244513 | 3338 | 98.6% |
| 5 | 73.07 | 73.04 | −0.03 | 100.0% | 234460 | 235974 | 1514 | 99.4% |
| 6 | 25.57 | 25.57 | — | 100.0% | 25295 | 25729 | 434 | 98.3% |
| 7 | 32.11 | 32.22 | 0.11 | 99.7% | 50218 | 49718 | −500 | 101.0% |
| 8 | 33.16 | 33.23 | 0.07 | 99.8% | 36142 | 35205 | −937 | 102.6% |
| 9 | 34.7 | 34.72 | 0.02 | 99.9% | 33658 | 34520 | 862 | 97.4% |

Additional experiments were also conducted to evaluate subsequent filtration media, including for example, the use of stainless steel wool. For these experiments, the stainless steel wool was packed into a copper tube and cooled to less than 1.9° C. After passing a liquid feed of tritium contaminated water through the packed copper tube, it was determined no separation or resulting concentration of tritium activity occurred. Without wishing to be bound by theory, it is believe this was because the steel wool filtration media had neither nucleation sites nor a crystal lattice structure for the tritium oxide ice to integrate into.

Still further, numerous experiments using frozen light or normal water as the filtration media were also attempted with no resulting concentration or separation of the initial feed activity. Again, without wishing to be bound by theory, it is believed this series of experiments performed poorly because the feed was operating above the freezing temperature of the filtration media. This resulted in the continuous melting of the filtration media and thus prevented any meaningful nucleation of the Tritium Oxide.

Lastly, a series of experiments attempting to test series concentration using several filters in series were performed. In these experiments the filtrate exiting a previous filter was used as feed for the subsequent filter. Though much of this data produced good concentrations relatively poor experiment temperature controls proved to make the data unreliable.

What is claimed is:

1. A method for separating a mixture of isotopologues, comprising:
   a) providing a liquid stream comprising a mixture of a first isotopologue having a first freezing temperature and a second isotopologue having a second freezing temperature, wherein the freezing temperature of the first isotopologue is below the freezing temperature of the second isotopologue; and
   b) introducing the liquid stream into a filter capable of selectively capturing the second isotopologue such that at least a portion of the second isotopologue remains in the filter and a liquid filtrate comprising the first isotopologue exits the filter.

2. The method of claim 1, wherein the filter is capable of selectively capturing by freezing at least a portion of the second isotopologue.

3. The method of claim 1, wherein the filter is capable of selective capturing by nucleating at least a portion of the second isotopologue.

4. The method of claim 2, wherein the filter of step b) comprises filter media maintained at a temperature between the freezing temperature of the first isotopologue and the freezing temperature of the second isotopologue.

5. The method of claim 4, wherein the filter media comprises a third isotopologue of the first and second isotopologues.

6. The method of claim 5, wherein the first isotopologue in the liquid stream is water, wherein the second isotopologue in the liquid stream is tritium oxide, and wherein the third isotopologue present in the filter media is deuterium oxide.

7. The method of claim 6, wherein the filter media is maintained at a temperature in the range of from greater than 0° C. to less than 3.82° C.

8. The method of claim 7, wherein prior to step b) of claim 1 the liquid stream is adjusted to a temperature in the range of from greater than 0° C. to less than 3.82° C.

9. The method of claim 7, wherein the filter media is maintained at a temperature in the range of from greater than 0° C. to 1.0° C.

10. The method of claim 6, further comprising:
    c) recovering the liquid filtrate from the filter without freezing the water present in the liquid filtrate and also without melting the frozen deuterium oxide present in the filter media.

11. The method of claim 6, wherein the frozen deuterium oxide filter media is provided as a plurality of finely divided particles having a particles size less than 425 μm.

12. The method of claim 1, wherein prior to step b) the second isotopologue is present in the liquid stream of step a) at a concentration greater than 20,000 pCi and wherein after step b) the concentration of second isotopologue present in the liquid filtrate is less than 20,000 pCi.

13. The method of claim 1, further comprising
    c) analyzing the filtrate of step b) to determine if an amount of second isotopologue remains in the filtrate.

14. The method of claim 13, wherein if it is determined that an amount of the second isotopologue remains in the filtrate and if the amount of second isotopologue remaining in the filtrate exceeds a predetermined threshold amount, the filtrate is reintroduced into the filter of step b).

15. The method of claim 13, wherein if it is determined that an amount of the second isotopologue remaining in the filtrate is less than a predetermined threshold amount the filtrate is then disposed of.

16. The method of claim 6, wherein after step b) of claim 1 the frozen deuterium oxide filter media and frozen tritium oxide are collected and recycled to provide a second generation filter media.

17. The method of claim 16, wherein the recycle step comprises: i) melting the frozen deuterium oxide filter media and frozen tritium oxide together to provide a combined melt stream; and ii) refreezing the combined melt stream.

* * * * *